US012780297B2

(12) United States Patent
Kim et al.

(10) Patent No.: US 12,780,297 B2
(45) Date of Patent: Nov. 3, 2026

(54) DEVICE FOR AND METHOD OF REDUCING VIBRATION IN STEERING SYSTEM

(71) Applicant: HYUNDAI MOBIS CO., LTD., Seoul (KR)

(72) Inventors: Ho Sik Kim, Yongin-si (KR); Seok Hwan Jang, Yongin-si (KR); Pil Sang Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/018,543

(22) Filed: Jan. 13, 2025

(65) Prior Publication Data

US 2025/0249954 A1 Aug. 7, 2025

(30) Foreign Application Priority Data

Feb. 1, 2024 (KR) ........................ 10-2024-0016245

(51) Int. Cl.
*B62D 5/04* (2006.01)

(52) U.S. Cl.
CPC ......... *B62D 5/0481* (2013.01); *B62D 5/0442* (2013.01); *B62D 5/046* (2013.01)

(58) Field of Classification Search
CPC .... B62D 5/0481; B62D 5/0442; B62D 5/046; B62D 5/0472
See application file for complete search history.

(56) References Cited

U.S. PATENT DOCUMENTS

2019/0308661 A1* 10/2019 Naik .................... B62D 5/0472

FOREIGN PATENT DOCUMENTS

KR 10-2012-0050644 A 5/2012

* cited by examiner

*Primary Examiner* — Long T Tran
*Assistant Examiner* — Charles J Brauch
(74) *Attorney, Agent, or Firm* — Morgan, Lewis & Bockius LLP

(57) ABSTRACT

In embodiments of the present disclosure, a device for reducing vibration in a steering system includes a filter configured to be positioned at an input terminal of a boost circuit and filter an input torque input to the input terminal of the boost circuit, a speed sensor, and a processor configured to control an operation of the filter to reduce vibration and vary a type of the filter based on vehicle speed measured by the speed sensor.

9 Claims, 14 Drawing Sheets

DEVICE FOR AND METHOD OF REDUCING VIBRATION IN STEERING SYSTEM

CROSS-REFERENCE TO RELATED APPLICATION

This application claims priority from and the benefit of Korean Patent Application No. 10-2024-0016245, filed on Feb. 1, 2024, which is hereby incorporated by reference for all purposes as if set forth herein.

BACKGROUND

Field

Exemplary embodiments of the present disclosure relate to a device for and a method of reducing vibration in a steering system.

Discussion of the Background

The advancement of electric power steering (EPS) has led drivers to place greater value on sensory aspects. This has resulted in a preference for vehicles that excel in reducing noise and vibration issues. Especially in steering, noise, vibration, and harshness (NVH) may be felt sensitively since NVH directly correlates with the vehicle. Furthermore, the growing electric vehicle market has heightened awareness of noise and vibration.

The EPS operates using a rotor, generating order components based on a vibration source. To reduce NVH-related issues caused by this, a fixed second-order filter is adopted. A conventional fixed-order notch filter effectively reduces main order components of hardware (H/W)-related ripple that occur during the operation of the EPS.

However, the conventional fixed second-order filter alone fails to adequately address booming (resonant) vibrations in certain frequency ranges when the vehicle is in motion, thereby compromising customer satisfaction with NVH performance. These vibrations are caused by vibrations in a steering system or external steering system components, which are transmitted through a mechanically connected drive line, resulting in steering wheel vibrations. This may lead to an unpleasant steering experience for the driver.

The related art of the present disclosure is disclosed in Korean Patent Application Publication No. 10-2012-0050644 (published on May 21, 2012).

SUMMARY

In embodiments of the present disclosure, a device for and a method of reducing vibration in a steering system are provided. This improves steering performance by reducing not only order-related noise and vibration that occur when a vehicle is stationary but also booming noise and vibration that occur when a vehicle is in motion at low creep speeds.

The problem(s) that the present disclosure is intended to solve are not limited to the problem(s) mentioned above, and other problem(s) not mentioned will be clearly understood by those skilled in the art from the following description.

In an embodiment of the present disclosure, a device for reducing vibration in a steering system includes a filter configured to be positioned at an input terminal of a boost circuit and filter an input torque input to the input terminal of the boost circuit, a speed sensor, and a processor configured to control an operation of the filter to reduce vibration and vary a type of the filter based on vehicle speed measured by the speed sensor.

The filter may include an nth-order filter or a frequency filter for external resonance.

When it is determined that the vehicle is stationary based on the vehicle speed measured by the speed sensor, the processor may use the nth-order filter to reduce ripple-related order vibration components from the input torque.

When the vehicle is equipped with a C-type electric power steering (EPS), the processor may use the nth-order filter to reduce 21st-order and 42nd-order vibration components from the input torque. When the vehicle is equipped with an R-type EPS, the processor may use the nth-order filter to reduce 10th-order and 20th-order vibration components from the input torque.

When it is determined that the vehicle is in motion based on the vehicle speed measured by the speed sensor, the processor may use the frequency filter for external resonance to reduce resonant vibration components in an external transmission system from the input torque.

The processor may determine that the vehicle is in motion at creep speeds when the vehicle speed is greater than 0 km/h and less than or equal to 10 km/h, and use the frequency filter for external resonance.

The input torque may include vibration components generated from at least one of driver torque and disturbances transmitted through a shaft transmission system.

In another embodiment of the present disclosure, a method of reducing vibration in a steering system includes varying, by a processor, a type of a filter positioned at an input terminal of a boost circuit based on vehicle speed measured by a speed sensor, and filtering, by the processor, an input torque input to the input terminal of the boost circuit using the filter.

In the embodiment, the method of reducing vibration in a steering system may further include determining, by the processor, whether the vehicle is stationary based on the vehicle speed measured by the speed sensor. When it is determined that the vehicle is stationary, the filtering of an input torque may include using an nth-order filter to reduce ripple-related order vibration components from the input torque.

In the embodiment, the method of reducing vibration in a steering system may further include determining, by the processor, whether the vehicle is in motion based on the vehicle speed measured by the speed sensor. When it is determined that the vehicle is in motion, the filtering of an input torque may include using a frequency filter for external resonance to reduce resonant vibration components in an external transmission system from the input torque.

Specific details of other embodiments are included in the detailed description and accompanying drawings.

In the embodiments of the present disclosure, it is possible to improve steering performance by reducing not only order-related noise and vibration that occur when a vehicle is stationary but also booming noise and vibration that occur when a vehicle is in motion at low creep speeds.

In the embodiments of the present disclosure, it is possible to address the NVH-related issues in steering, which are exacerbated with the increasing adoption of electric vehicles. In particular, vibrations that vary with vehicle speed may be effectively reduced by separating the vibration into order components and frequency components.

In the embodiments of the present disclosure, it is possible to achieve higher tuning flexibility compared to existing logic and improve steering performance by mitigating stickiness and inertia during steering within a customer's steering range.

In the embodiments of the present disclosure, it is possible to enhance cost competitiveness by designing products without developing additional components for increased mass and damping.

DETAILED DESCRIPTION OF THE ILLUSTRATED EMBODIMENTS

Figure 1:
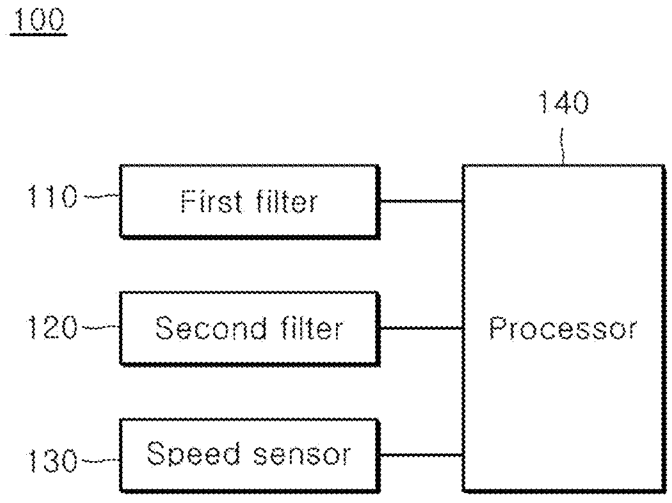
FIG. 1 is a block diagram illustrating a device for reducing vibration in a steering system according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

FIG. 1 is a block diagram illustrating a device for reducing vibration in a steering system according to an embodiment of the present disclosure.

Referring to FIG. 1, a device for reducing vibration in a steering system may include a first filter 110, a second filter 120, a speed sensor 130, and a processor 140.

The first filter 110 may be positioned at an input terminal of a boost circuit (see 510 in FIG. 5) and filter an input torque input to the input terminal of the boost circuit. In this case, the input torque may include vibration components generated from disturbances transmitted through a shaft transmission system and from driver torque.

Figure 5:
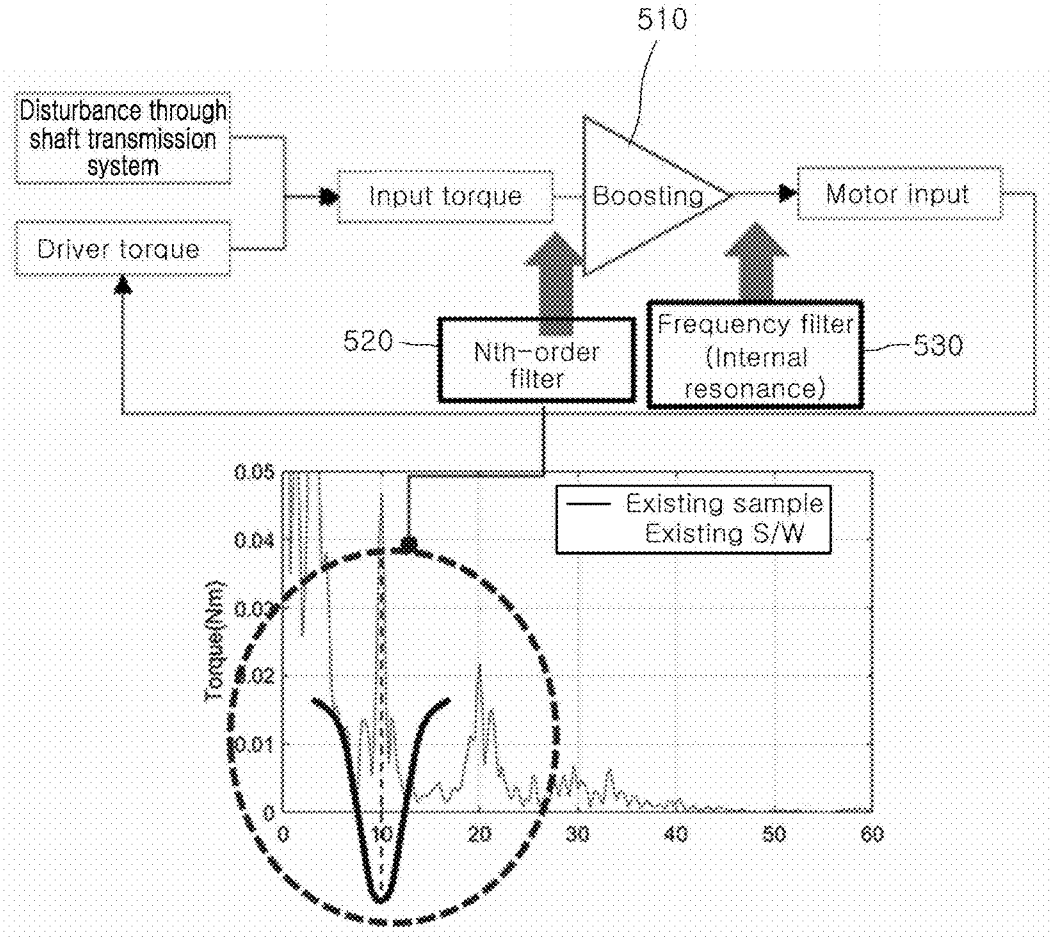
FIGS. 5 and 6 are diagrams illustrating a structure in which a filter type varies based on vehicle speed.
Figure 6:
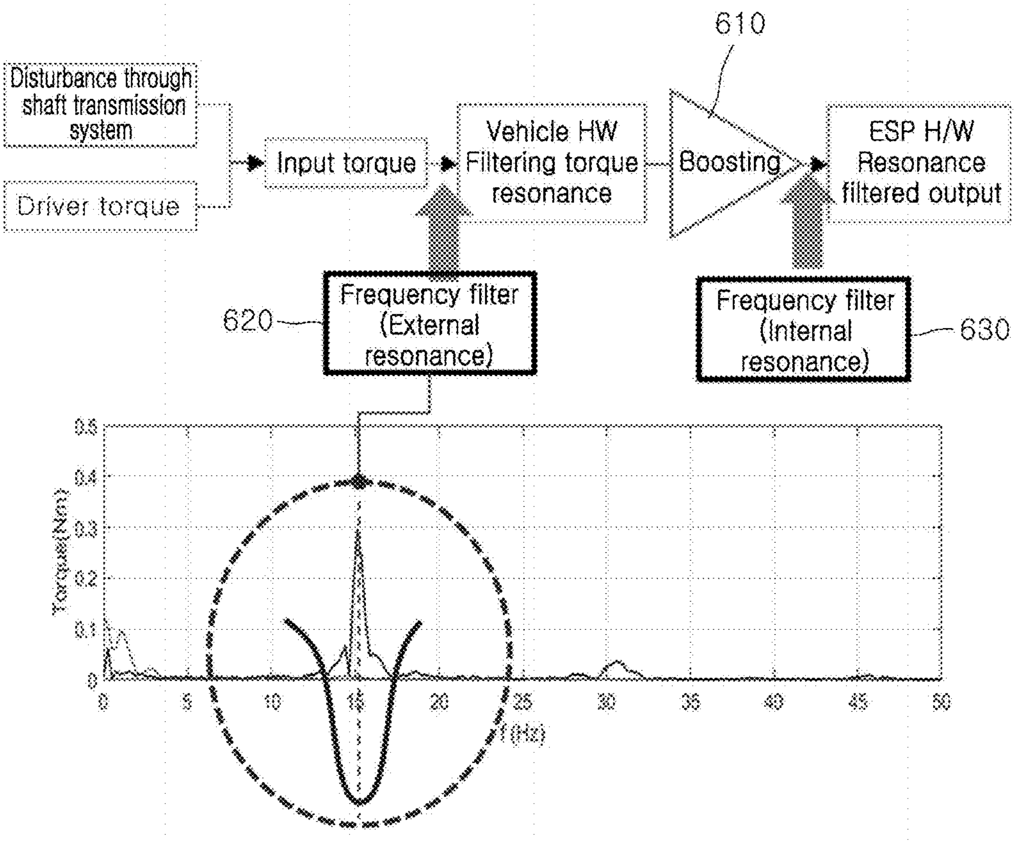

The first filter 110 may include an nth-order filter (see 520 in FIG. 5) or a frequency filter for external resonance (see 620 in FIG. 6). In other words, the first filter 110 may use the nth-order filter when a vehicle is stationary and use the frequency filter for external resonance when the vehicle is in motion.

The second filter 120 may be positioned at an output terminal of the boost circuit and filter an output torque of the boost circuit. In this case, the output torque may refer to torque boosted to a certain level based on boosting logic of the boost circuit.

The second filter 120 may include a frequency filter for internal resonance (see 530 in FIG. 5, 630 in FIG. 6).

The speed sensor 130 may measure the vehicle speed. The vehicle speed measured by the speed sensor 130 may be used by the processor 140 to determine whether the vehicle is stationary or in motion.

The processor 140 may control the operation of each of the first filter 110 and the second filter 120 to reduce vibration. In this case, the processor 140 may vary a filter type for the first filter 110 based on the vehicle speed measured by the speed sensor 130.

According to an embodiment, when the processor 140 determines that the vehicle is stationary based on the vehicle speed measured by the speed sensor 130, the processor 140 may use the nth-order filter as the first filter 110 and the frequency filter for internal resonance as the second filter 120.

The processor 140 may use the nth-order filter to reduce ripple-related order vibration components from the input torque, and use the frequency filter for internal resonance to reduce resonant vibration components in an internal transmission system from the output torque of the boost circuit.

In this case, for example, when the vehicle is equipped with a C-type electric power steering (EPS), the processor 140 may use the nth-order filter to reduce 21st-order and 42nd-order vibration components from the input torque.

Furthermore, for example, when the vehicle is equipped with an R-type EPS, the processor 140 may use the nth-order filter to reduce 10th-order and 20th-order vibration components from the input torque.

According to an embodiment, when the processor 140 determines that the vehicle is in motion based on the vehicle speed measured by the speed sensor 130, the processor 140 may use the frequency filter for external resonance as the first filter 110 and the frequency filter for internal resonance as the second filter 120.

The processor 140 may use the frequency filter for external resonance to reduce resonant vibration components in an external transmission system from the input torque and use the frequency filter for internal resonance to reduce resonant vibration components in an internal transmission system from the output torque of the boost circuit.

In other words, for example, the processor 140 may determine that the vehicle is in motion at creep speeds when the vehicle speed is greater than 0 km/h and less than or equal to 10 km/h, and use the frequency filter for external resonance as the first filter 110 accordingly. However, the processor 140 may use the frequency filter for internal resonance as the second filter 120 on a fixed basis.

Figure 2:
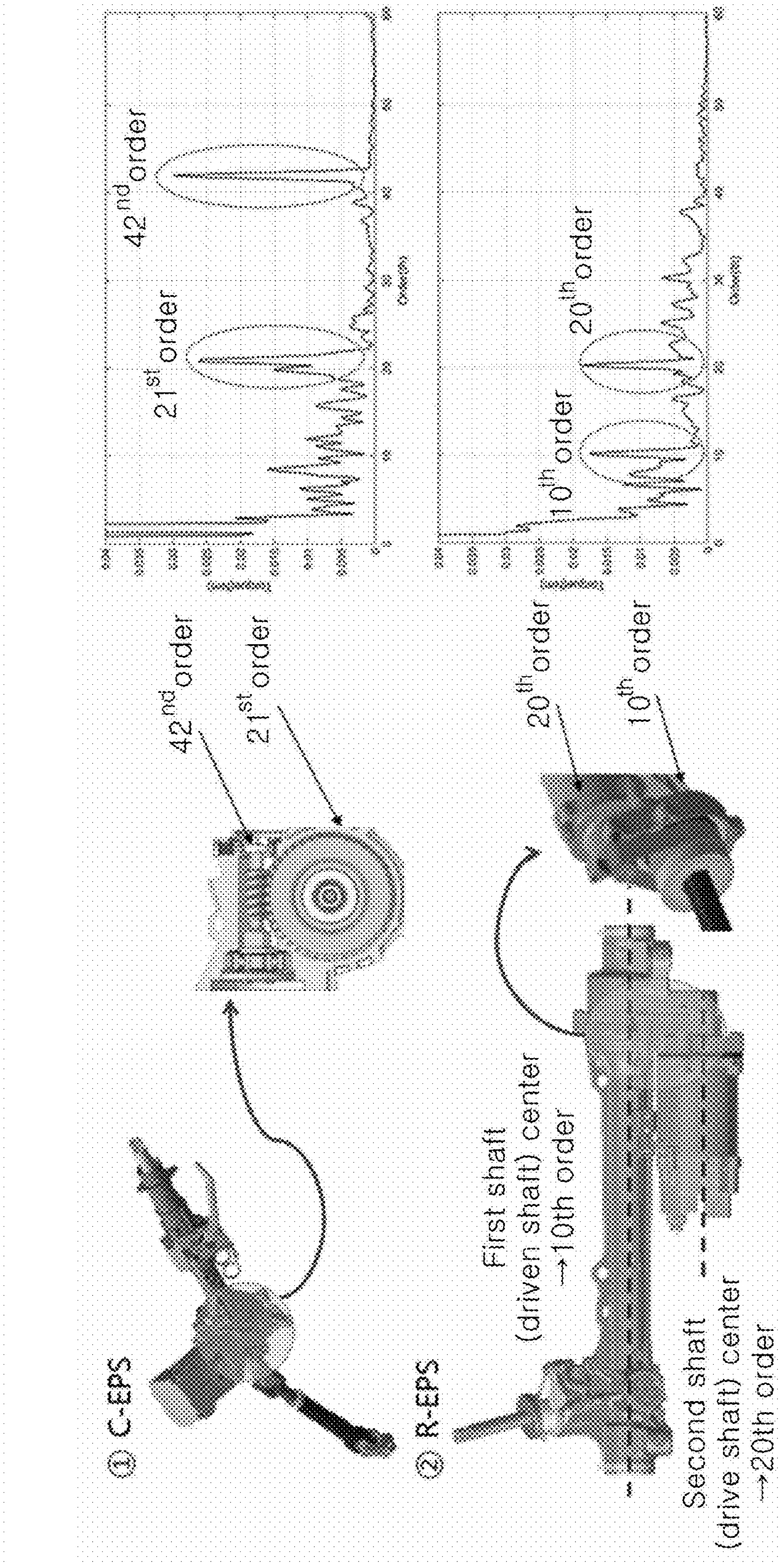
FIG. 2 is a diagram illustrating vibration characteristics that occur when a vehicle is stationary.

FIG. 2 is a diagram illustrating vibration characteristics that occur when a vehicle is stationary. FIGS. 3 and 4A to 4C are diagrams illustrating vibration characteristics that occur when a vehicle is in motion at low creep speeds.

When the vehicle is stationary, order-related noise and vibration (ripple) may occur. For the order-related noise and vibration, a C-type EPS (C-EPS) may have 21st-order and 42nd-order vibration components and an R-type EPS (R-EPS) may have 10th-order and 20th-order vibration components due to their mechanical properties, as illustrated in FIG. 2. The order-related noise and vibration are more easily perceived during stationary steering but are hard to perceive when the vehicle is in motion due to light loads.

Figure 3:
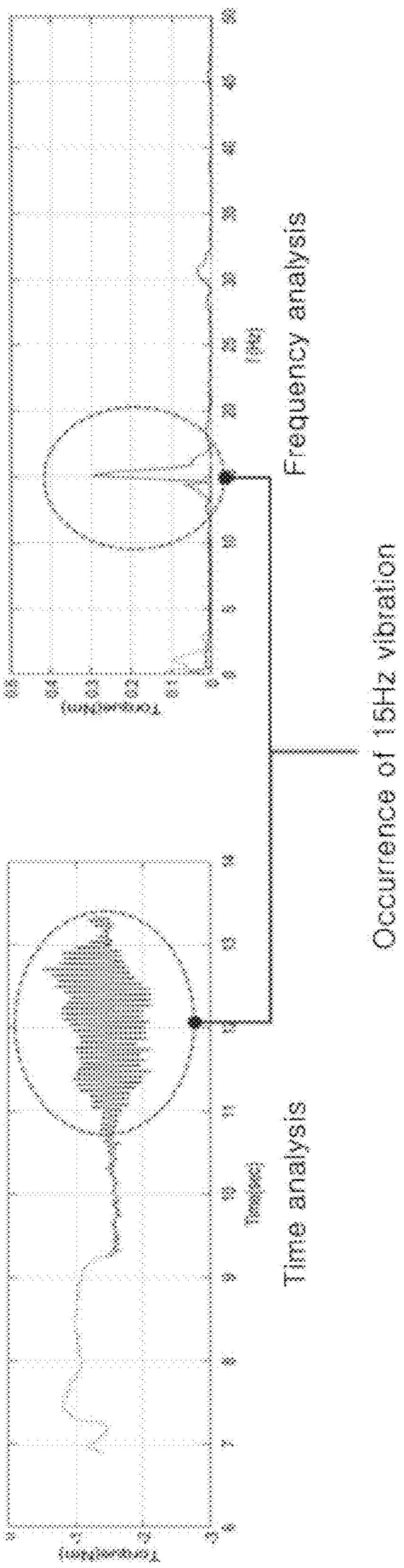
FIGS. 3 and 4A to 4C are diagrams illustrating vibration characteristics that occur when a vehicle is in motion at low creep speeds.

Booming (resonant) vibration may occur when the vehicle is in motion, especially at creep speeds. When the vehicle is in motion at creep speeds (10 kph or less), vibration at 15 Hz may occur within the steering range from the end of the steering angle to 360 degrees, as illustrated in FIG. 3. The booming vibration may differ from a resonance (8 Hz) in an internal transmission system of the R-EPS. Thus, this booming vibration may be estimated and measured as a resonance in an external transmission system.

Figure 4A:
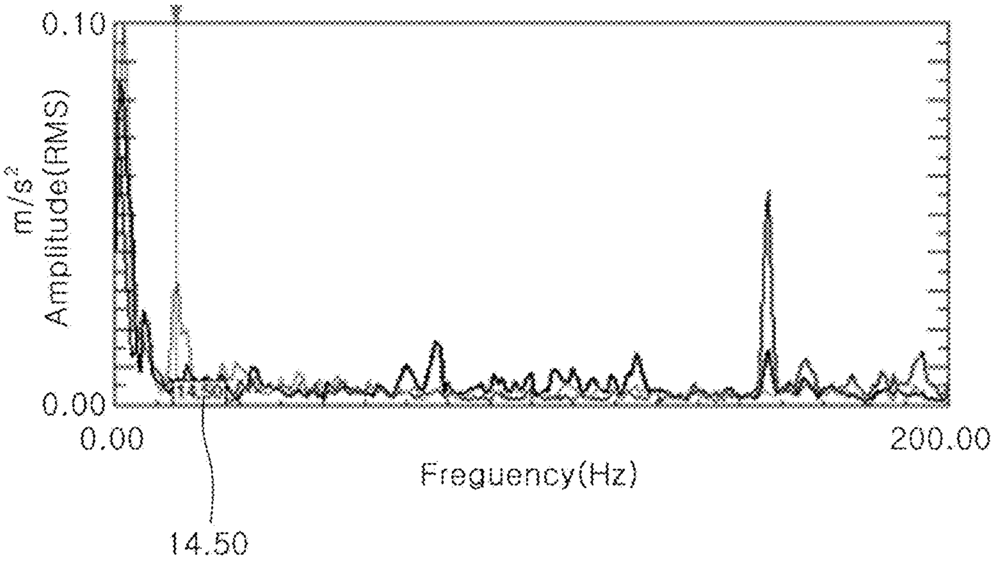
Figure 4B:
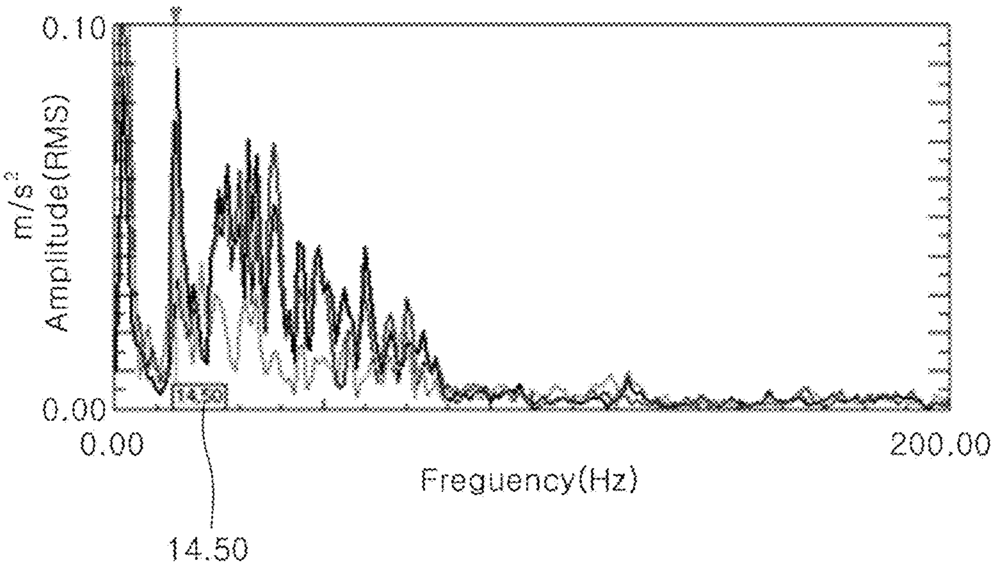
Figure 4C:
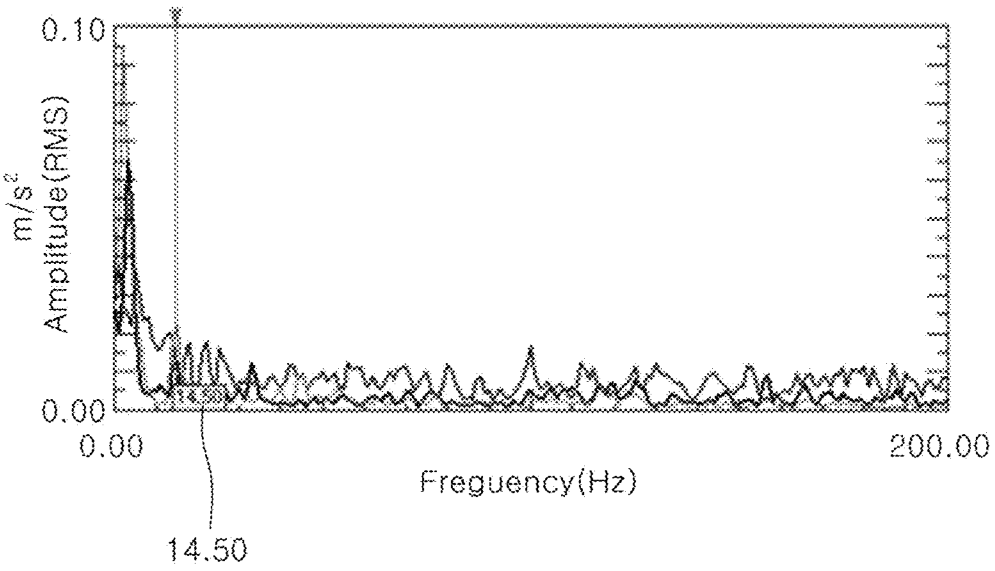

According to the vibration measurement results, as illustrated in FIGS. 4A to 4C, it may be seen that the largest vibration occurs at a knuckle. Therefore, it may be concluded that the booming vibration is a vibration in the external transmission system.

FIGS. 5 and 6 are diagrams illustrating a structure in which a filter type varies based on vehicle speed. FIGS. 7A to 7B and 8A to 8C are diagrams illustrating improvements resulting from varying a filter type based on vehicle speed.

Referring to FIG. 5, when a vehicle is stationary, an nth-order filter 520 and a frequency filter for internal resonance 530 may be used. The nth-order filter 520 may serve to minimize rotational ripple (e.g., 10th-order ripple vibration in EPS), and the frequency filter for internal resonance 530 may serve to minimize internal resonance in EPS.

The nth-order filter 520 may be positioned at an input terminal of a boost circuit 510 due to vibration characteristics, and the frequency filter for internal resonance 530 may be positioned at an output terminal of the boost circuit 510 due to resonance characteristics.

Referring to FIG. 6, when a vehicle is in motion, a frequency filter for external resonance 620 and a frequency filter for internal resonance 630 may be used. When a vehicle is in motion, unlike when stationary, disturbances may occur and be transmitted to a driver through a shaft transmission system. Furthermore, the disturbance may be added to the existing torque generated by the driver, resulting in an adjusted input torque.

Conventional nth-order filters and frequency filters often exhibit limitations in filtering out the disturbance. This may lead to filtered vibration components feeding back into an EPS logic input, resulting in amplified disturbances that are fed back to the driver. Therefore, a new filter needs to be appropriately positioned to mitigate resonance caused by vehicle disturbances when in motion.

For the selection and design of the appropriate filter, the selection of a center frequency and the logical position of the filter are crucial. Therefore, an optimal filter may be designed to mitigate disturbance-induced resonance as follows:

1. Using a notched bandpass filter to mitigate certain resonances may minimize the loss of steering assist to the greatest extent.
2. For the filter, since the resonance frequency remains constant at 13 Hz with respect to a steering angular velocity, a frequency filter may be selected and designed with a center frequency of 13 Hz.
3. Adding another frequency filter to the existing stationary-state filter structure may make control more challenging, as the presence of three filters may reduce the response margin. The ripple that occurs at maximum load in a stationary state is nearly insignificant under light loads in motion. Therefore, the existing nth-order filter used in the stationary state may be removed and repositioned immediately before the logic input (a boosting circuit 610), where disturbances and driver input torque are combined. This may allow for significant reduction of 13 Hz resonance noise before this resonance noise is amplified by the logic.

Accordingly, when the vehicle is in motion, the frequency filter for external resonance 620 may be positioned at an input terminal of the boosting circuit 610, and the frequency filter for internal resonance 630 may be positioned at an output terminal of the boosting circuit 610, as illustrated in FIG. 6.

The frequency filter for external resonance 620 and the frequency filter for internal resonance 630 share the same shape but differ in center frequency and bandwidth. These filters may allow for reduction of both external and internal resonances in EPS.

Figure 7A:
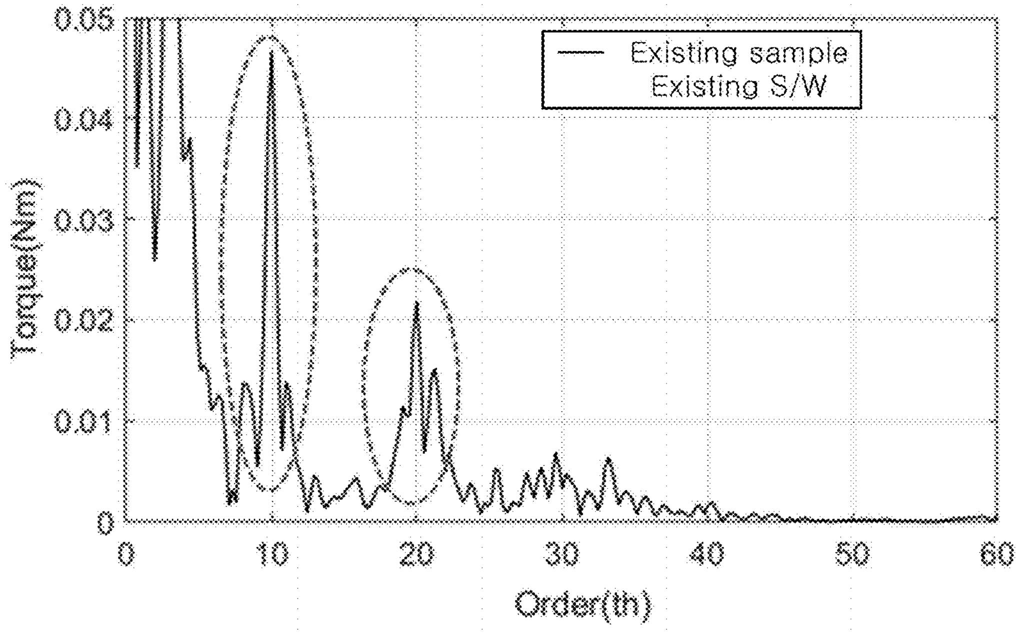
FIGS. 7A to 7B and 8A to 8C are diagrams illustrating improvements resulting from varying a filter type based on vehicle speed.
Figure 7B:
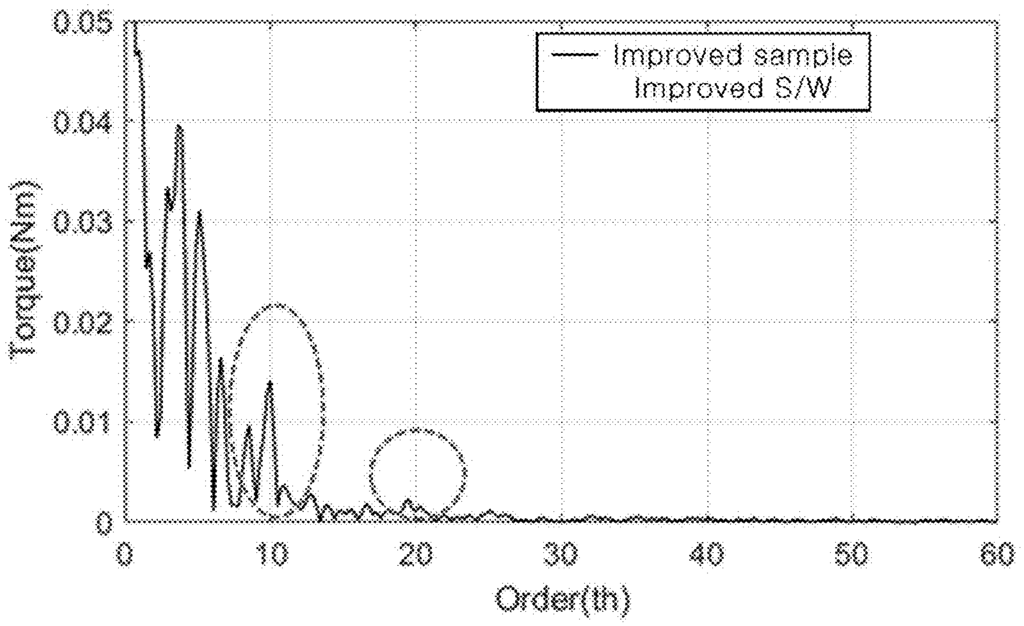

As illustrated in FIG. 5, when the vehicle is stationary, the improvements illustrated in FIGS. 7A and 7B may be achieved by using the nth-order filter 520 and the frequency filter for internal resonance 530. As illustrated in FIG. 6, when the vehicle is in motion, the improvements illustrated in FIGS. 8A to 8C may be achieved by using the frequency filter for external resonance 620 and the frequency filter for internal resonance 630.

Figure 8A:
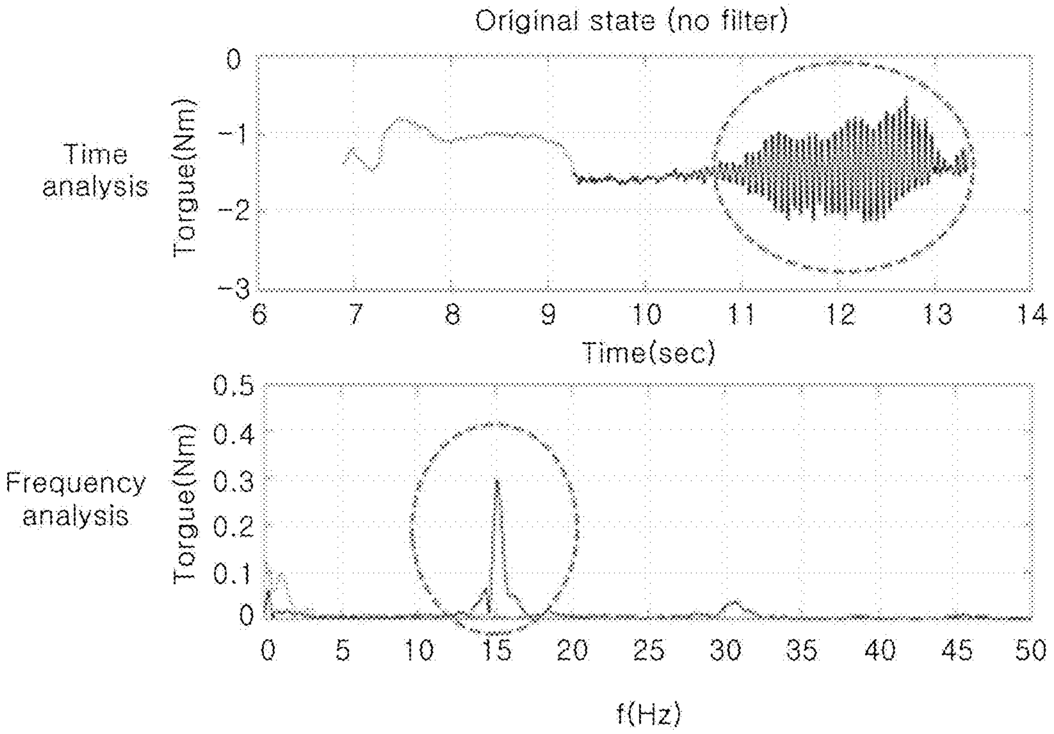
Figure 8B:
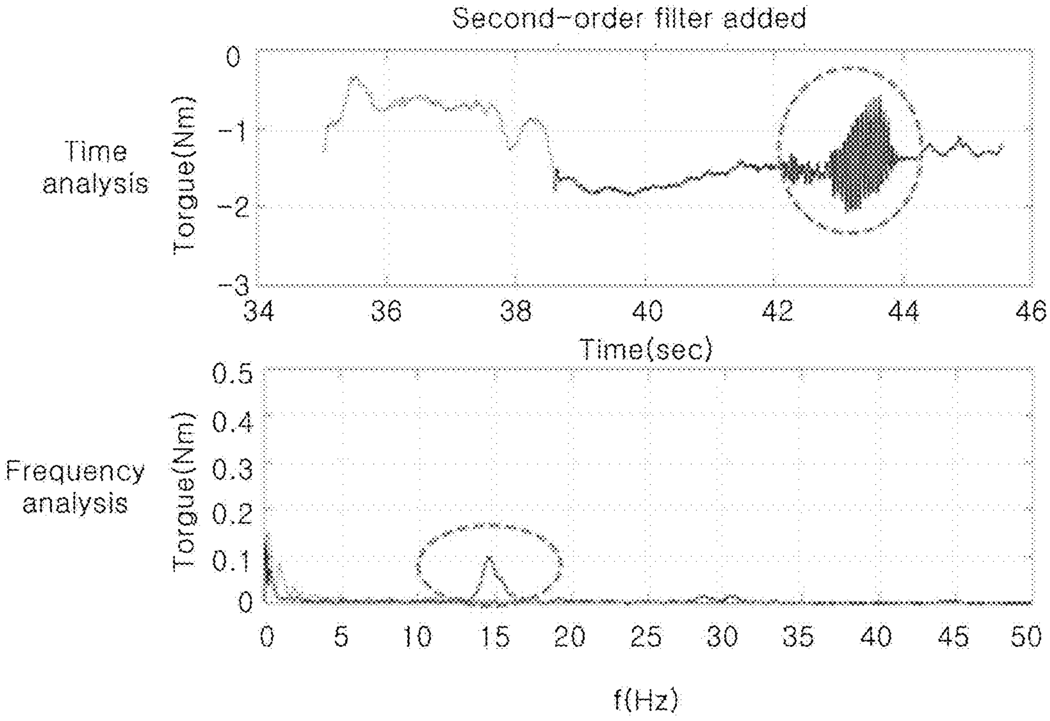
Figure 8C:
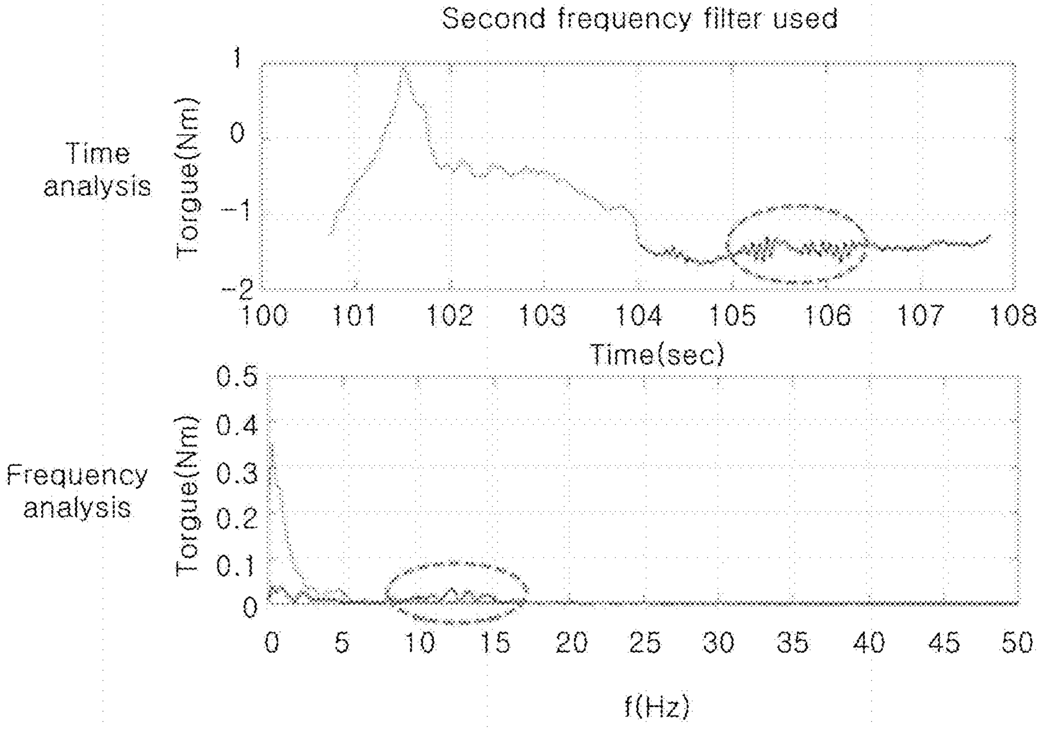

In other words, as illustrated in FIGS. 7A and 7B, when the vehicle is stationary, ripple-related order vibration components in EPS may be reduced. As illustrated in FIGS. 8A to 8C, when the vehicle is in motion (at low creep speeds), booming vibration components may be reduced. In particular, as illustrated in FIGS. 8A to 8C, using a second-order filter reduces the frequency range of vibrations, although the vibration magnitude remains similar to the original state (no filter). However, using a second frequency filter according to the embodiment reduces both the frequency range and the vibration magnitude.

In the embodiment of the present disclosure, the filter is varied based on the characteristics of ripple vibration when the vehicle is stationary and booming vibration when the vehicle is in motion. This approach enhances noise, vibration, harshness (NVH) improvement and ensures phase margin stability.

Figure 9:
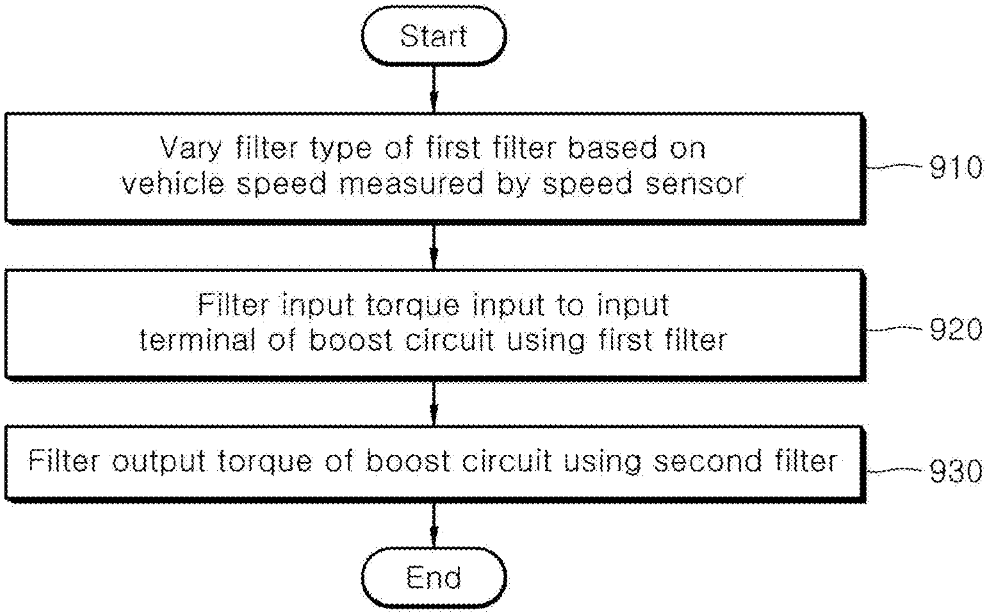
FIG. 9 is a flow diagram illustrating a method of reducing vibration in a steering system according to another embodiment of the present disclosure.

FIG. 9 is a flow diagram illustrating a method of reducing vibration in a steering system according to another embodiment of the present disclosure.

The method of reducing vibration in a steering system described herein is only one embodiment of the present disclosure. Various steps below can be added as needed, and the following steps can also be implemented in a different order. Therefore, the disclosure is not limited to each of the steps described below and the order thereof.

Referring to FIGS. 1 and 9, at step 910, a processor 140 may vary a filter type of a first filter 110 positioned at an input terminal of a boost circuit based on vehicle speed measured by a speed sensor 130.

Next, at step 920, the processor 140 may filter an input torque input to the input terminal of the boost circuit using the first filter 110.

In other words, when it is determined that the vehicle is stationary, the processor 140 may use an nth-order filter as the first filter 110 to reduce ripple-related order vibration components from the input torque.

Alternatively, when it is determined that the vehicle is in motion, the processor 140 may use a frequency filter for external resonance as the first filter 110 to reduce resonant vibration components in an external transmission system from the input torque.

Next, at step 930, the processor 140 may filter an output torque of the boost circuit using a second filter 120.

In other words, when it is determined that the vehicle is stationary or in motion, the processor 140 may use a frequency filter for internal resonance as the second filter 120 to reduce resonant vibration components in an internal transmission system from the output torque of the boost circuit.

As described above, although embodiments of the present disclosure have been described with limited embodiments and drawings, it will be apparent to those skilled in the art that various modifications and variations can be made from these embodiments disclosed herein. For example, suitable results may be achieved if the described techniques are performed in a different order and/or if components in a described system, structure, device, or circuit are combined in a different manner and/or replaced or supplemented by other components or their equivalents.

Therefore, other implementations, other embodiments and equivalents of the claims also fall within the scope of the following claims.

What is claimed is:

1. A device for reducing vibration in a steering system, the device comprising:

a boost circuit including an input terminal and an output terminal;

a filter configured to be positioned at the input terminal of the boost circuit and filter an input torque input to the input terminal of the boost circuit;

a speed sensor; and a processor configured to control an operation of the filter to reduce vibration and vary a type of the filter based on vehicle speed measured by the speed sensor, wherein the boost circuit is configured to boost the filtered input torque based on boosting logic and output a boosted torque at the output terminal, wherein the filter includes an nth-order filter, wherein, when determining that the vehicle is stationary based on the vehicle speed measured by the speed sensor, the processor is configured to use the nth-order filter to reduce ripple-related order vibration components from the input torque, and wherein, when the vehicle is equipped with a C-type electric power steering (EPS), the processor is configured to use the nth-order filter to reduce 21st-order and 42nd-order vibration components from the input torque, and when the vehicle is equipped with an R-type EPS, the processor is configured to use the nth-order filter to reduce 10th-order and 20th-order vibration components from the input torque.

2. The device of claim 1, wherein the filter further includes a frequency filter for external resonance.

3. The device of claim 2, wherein, when determining that the vehicle is in motion based on the vehicle speed measured by the speed sensor, the processor is configured to use the frequency filter for external resonance to reduce resonant vibration components in an external transmission system from the input torque.

4. The device of claim 3, wherein the processor is configured to determine that the vehicle is in motion at creep speeds when the vehicle speed is greater than 0 km/h and less than or equal to 10 km/h, and use the frequency filter for external resonance.

5. The device of claim 1, wherein the input torque includes vibration components generated from at least one of driver torque and disturbances transmitted through a shaft transmission system.

6. A method of reducing vibration in a steering system of a vehicle, the method comprising:

varying, by a processor, a type of a filter positioned at an input terminal of a boost circuit based on vehicle speed measured by a speed sensor;

filtering, by the processor, an input torque input to the input terminal of the boost circuit using the filter; and boosting, by the boost circuit, the filtered input torque based on boosting logic, and outputting a boosted torque at an output terminal of the boost circuit, wherein the method further comprises:

determining, by the processor, whether the vehicle is stationary based on the vehicle speed measured by the speed sensor, wherein the filtering of the input torque includes using an nth-order filter to reduce ripple-related order vibration components from the input torque when the processor determines that the vehicle is stationary, and wherein, when the vehicle is equipped with a C-type electric power steering (EPS), the filtering of the input torque includes using the nth-order filter to reduce 21st-order and 42nd-order vibration components from the input torque, and when the vehicle is equipped with an R-type EPS, the filtering of the input torque includes using the nth-order filter to reduce 10th-order and 20th-order vibration components from the input torque.

7. The method of claim 6, further comprising determining, by the processor, whether the vehicle is in motion based on the vehicle speed measured by the speed sensor, wherein the filtering of the input torque includes using a frequency filter for external resonance to reduce resonant vibration components in an external transmission system from the input torque when the processor determines that the vehicle is in motion.

8. The method of claim 7, wherein, when the processor determines that the vehicle is in motion at creep speeds when the vehicle speed is greater than 0 km/h and less than or equal to 10 km/h, the filtering of the input torque includes using the frequency filter of the filter for external resonance.

9. The method of claim 6, wherein the input torque includes vibration components generated from at least one of driver torque and disturbances transmitted through a shaft transmission system.

* * * * *